United States Patent
Garat (10) Patent No.: US 6,557,901 B1
(45) Date of Patent: May 6, 2003

(54) DEVICE FOR JOINING TWO TUBULAR ELEMENTS WITH SEMITORIC FLANGE EXTENSIONS

(75) Inventor: Paul Garat, Bethune (FR)

(73) Assignee: Qualetude S.A. (FR)

( * ) Notice: Subject to any disclaimer, the term of this patent is extended or adjusted under 35 U.S.C. 154(b) by 11 days.

(21) Appl. No.: 09/716,859

(22) Filed: Nov. 20, 2000

Related U.S. Application Data (63) Continuation of application No. PCT/FR99/01203, filed on May 20, 1999.

(30) Foreign Application Priority Data

May 20, 1998 (FR) .............................................. 98/06416
Dec. 24, 1998 (FR) .............................................. 98/16429

(51) Int. Cl.$^7$ ................................................. F16L 35/00
(52) U.S. Cl. ....................... 285/226; 285/424; 285/921; 285/903
(58) Field of Search ................................. 285/921, 226, 285/260, 218, 322, 903, 424, 179.2; 52/478

(56) References Cited

U.S. PATENT DOCUMENTS

| | | | | | |
|---|---|---|---|---|---|
| 944,985 A | * | 12/1909 | Pankhurst et al. | .......... | 285/903 |
| 1,791,255 A | * | 2/1931 | Wagner | ....................... | 285/921 |
| 2,410,786 A | * | 11/1946 | Mallory | ....................... | 285/260 |
| 2,565,610 A | * | 8/1951 | Kinghorn | ....................... | 52/478 |
| 2,962,307 A | * | 11/1960 | Nebinger | ..................... | 285/424 |
| 3,217,400 A | * | 11/1965 | Illesy et al. | .................. | 285/921 |
| 3,603,057 A | * | 9/1971 | Curran | ......................... | 52/478 |
| 4,046,409 A | * | 9/1977 | Virgin | ......................... | 285/921 |
| 4,173,361 A | * | 11/1979 | Gagas | ......................... | 285/921 |
| 4,418,943 A | * | 12/1983 | Ionna | ......................... | 285/424 |
| 4,495,743 A | * | 1/1985 | Ellison et al. | ................. | 52/478 |
| 4,523,780 A | * | 6/1985 | Cheer | ......................... | 285/921 |
| 4,697,832 A | * | 10/1987 | Dickirson | .................... | 285/921 |
| 4,865,362 A | * | 9/1989 | Holden | ......................... | 285/903 |
| 4,929,236 A | * | 5/1990 | Sampson | ..................... | 285/921 |
| 5,549,583 A | * | 8/1996 | Sanford et al. | ............. | 285/921 |
| 5,934,710 A | * | 8/1999 | Le Foll | ....................... | 285/921 |

FOREIGN PATENT DOCUMENTS

EP  0833093  *  1/1998  .................. 285/921

* cited by examiner

*Primary Examiner*—Eric K. Nicholson
(74) *Attorney, Agent, or Firm*—Schnader Harrison Segal & Lewis LLP (57) ABSTRACT

A device for joining two tubular elements composed of two complementary parts extending end portions of the tubular elements, the two complementary parts each including an essentially rigid substantially conical flared part extended by a semitoric flange, with the semitoric collars being capable of interlocking together.

26 Claims, 10 Drawing Sheets

Fig. 16 ered Dec. 24, 1998.

DEVICE FOR JOINING TWO TUBULAR ELEMENTS WITH SEMITORIC FLANGE EXTENSIONS

RELATED APPLICATION

This is a continuation of International Application No. PCT/FR99/01203, with an international filing date of May 20, 1999, which is based on French Patent Application No. 98/06416, filed May 20, 1998, and French Patent Application No. 98/16429, filed Dec. 24, 1998.

FIELD OF THE INVENTION

This invention pertains to joining tubular elements and the joining of a tubular element to an accessory. The invention relates to tubes for the circulation of gaseous and liquid fluids, powders and, more generally, all uses of metal and plastic tubes and ducts.

BACKGROUND

Known in the state of the art are diverse solutions for joining two tubes or joining a tube to an accessory. Certain solutions employ connecting pieces such as collars or rings. These solutions have the disadvantage of requiring the operations of positioning, assembly and maintenance. In addition, the risk of unexpected falling apart can not be completely ruled out. Other solutions consist of providing complementary snap connectors at the ends of the tubes.

As an example, one can cite FR 2,754,037 which describes a device for the tight end-to-end joining of metal tubes. In this device, the upper element has, facing the lower element A and moving towards the exterior from a cylindrical part, a tapered rib spreading upward and encompassing a circular groove, with said groove having an opening cross section and an elastically deformable external skirt, while the lower element has, facing the upper element and moving towards the exterior, starting from a cylindrical part, a tapered cup that widens towards the top and designed to receive the rib of the upper element and edged with an external tapered skirt that spreads towards the bottom, with said external skirt forming, with the wall of the cup, a circular rib, and which is able to elastically come into contact against the internal face of the external skirt of the upper element, in the rib of this element, and that the lower edge of the external skirt of the upper element A has holding means snapping on the side of the external skirt of the lower element B.

This device has certain disadvantages. First, manufacture of such devices is relatively costly. In addition, joining and disassembly of such devices is not always easy. The goal of the invention is to resolve these disadvantages by proposing a device which is reliable, easy to use and inexpensive in use. The goal is to attain a rapid and tight connection.

SUMMARY OF THE INVENTION

The invention relates in one aspect to a device for joining two tubular elements composed of two complementary parts extending end portions of the tubular elements, the two complementary parts each including an essentially rigid substantially conical flared part extended by a semitoric flange, with the semitoric flanges being capable of interlocking together. In another aspect, the invention relates to a tubular element adapted to be joined with a complementary element having on at least one of its ends a joining means, the joining means including an essentially rigid conical flared part, extended by a semitoric flange.

BRIEF DESCRIPTION OF THE INVENTION

Better comprehension of the invention will be obtained from the description below with reference to the attached drawings in which.

DETAILED DESCRIPTION OF THE INVENTION

The following description is intended to refer to specific embodiments of the invention illustrated in the drawings and is not intended to define or limit the invention, other than in the appended claims. Also, the drawings are not to scale and various dimensions and proportions are contemplated.

The invention concerns in its broadest sense a device for joining two tubular elements composed of two complementary parts extending the ends of said tubular elements, characterized in that the two complementary parts are each constituted by an essentially rigid conical flared part extended by a semitoric flange, with the semitoric collars being capable of interlocking together. The tapered flared parts preferably spread in the direction of the joining plane. The semitoric collars advantageously present a closed section over approximately 180°.

According to a preferred mode of implementation, the semitoric collars present external extensions extending essentially perpendicularly to the joining plane of the two tubular elements.

According to one variant, one of the semitoric flanges presents a deformation for housing a semitoric joint. According to one particular mode of implementation, the section of the exterior semitoric collar presents at rest a radius of curvature slightly smaller than the section of the interior semitoric collar. According to one advantageous variant, at least one of the conical flared parts presents crimps. According to another variant, both conical flared parts present crimps. According to one particular mode of implementation, the devices are fixed on the tubular elements by a connecting means such as couplings, collars, welding, gluing or rivets.

The invention also pertains to a tubular element that can be joined with a complementary element, of the type presenting on at least one of its ends a joining means characterized in that this joining means is constituted by an essentially rigid conical flared part, extended by a semitoric flange.

The invention also pertains to a process for the manufacture of a joining device or a connectable element presenting a conical part extended by a semitoric flange, characterized in that one deforms the end of a tubular element. According to one particular mode of implementation, the device for joining two tubular elements according to the invention is characterized in that it also includes a rod for locking together the interlocking semitoric flanges. The exterior semitoric flange is advantageously extended by a circumferential rib in which said locking rod can be placed for locking the assembly.

According to one particular mode of implementation, the interior semitoric flange presents a half-ring edge. The exterior semitoric flange preferably presents radial slits for delimiting flexible tabs. According to another particular mode of implementation, at least one of the tubular elements presents an exterior ring to facilitate welding on a complementary piece. According to another variant of implementation, at least one of the parts is formed by a multiplicity of superposed strips. At least one of the parts preferably presents a crimped zone between the tubular element and the toric flared part.

According to a first variant, the crimped zone presents a succession of crimps that are axially oriented and axially spaced apart. According to a second variant, the crimped zone presents a succession of crimps that are oriented transversely and transversely spaced apart. According to another particular mode of implementation, the crimped zone is protected by a cone-shaped case. According to another variant, a bearing for damping vibrations is placed on the joining zone. This bearing can be made of pressed fibers.

Figure 1:
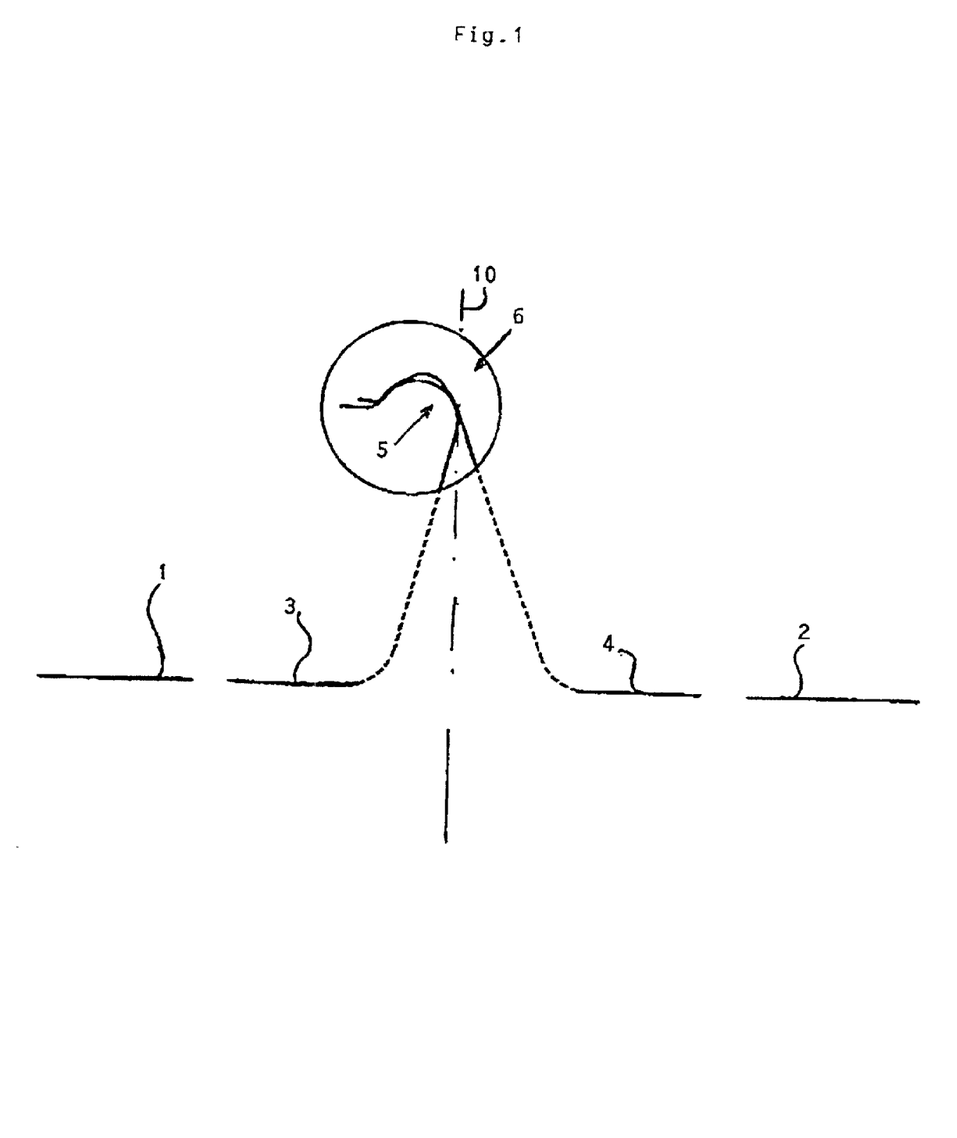
FIG. 1 shows a partial sectional view of a device according to the invention.

FIG. 1 shows a partial sectional view of a joining device according to the invention. The device makes possible the joining of a first tubular element (1) with a second tubular element (2). The tubular element (1) is extended by a flared conical skirt (3) which opens towards a joining plane (10). The angle formed by the wall of the conical skirt (3) in relation to the joining plane (10) is approximately 20°.

Likewise, the tubular element (2) is extended by a flared conical skirt (4) which opens towards the joining plane (10). The angle formed by the wall of the conical skirt (4) in relation to the joining plane (10) is approximately 20°. The two conical skirts (3, 4) open towards each other so as to delimit a lenticular hollow space.

Figure 2:
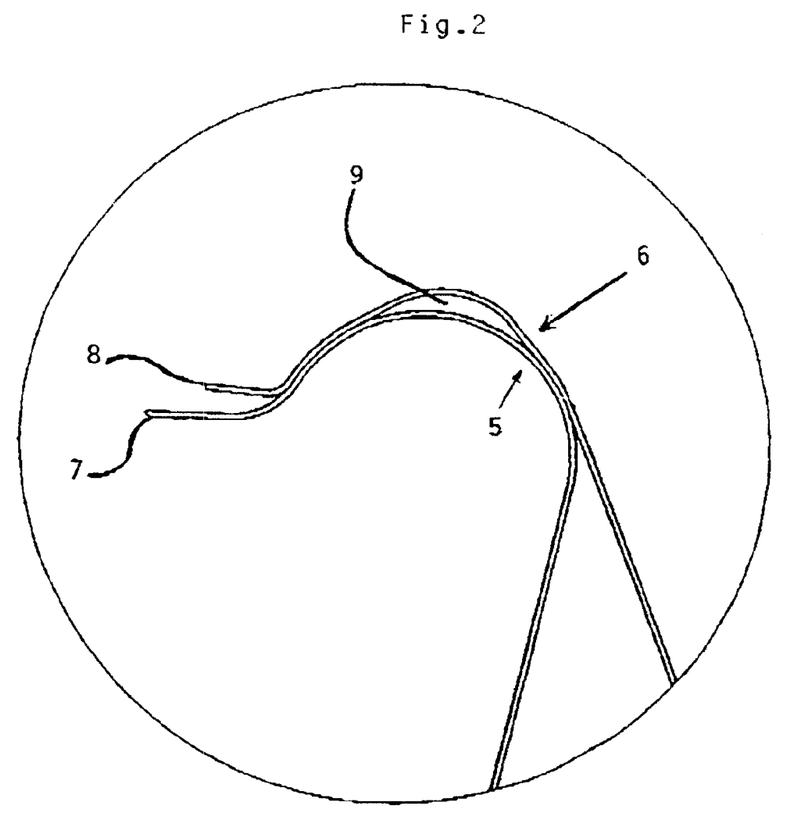
FIG. 2 shows an enlarged view of a "snap-on" zone.

These two skirts are extended by semitoric flanges (5, 6) that can interlock with each other. These semitoric flanges (5, 6) present a section in the form of a semicircle extending over approximately 180°. They are extended by lips (7, 8) oriented more or less perpendicularly to the joining plane (10) as shown in FIG. 2. The exterior lip (8) is slightly more flared than the interior lip (7) so as to not impede the introduction of the semitoric flange (5) into the exterior semitoric flange (6).

The lip (7) extending the interior flange (5) is preferentially split. The average radius of curvature of the exterior flange (6) at rest is slightly smaller than the average radius of curvature of the interior flange (5) at rest to create a slight mechanical stress reinforcing the connection after joining the tubes.

One of the semitoric flanges, the exterior flange (6) in this instance, has a rib (9) in which a joint can be incorporated. The joining device is made of an elastically deformable rigid material, for example of steel. It can be made by deformation of the ends of the two tubes to be joined. It can also be made by assembling two independent elements on the ends of the tubes.

In order to join two tubes, it is sufficient to position them in each other's extensions. The joining devices face each other. Manual force is then applied on the element fitted with the interior flange (5) against the element fitted with the exterior flange (6). It is also possible to apply this force by means of a suitable mechanism. The interior semitoric flange (5) then interlocks in the exterior semitoric flange (6) because of the elasticity of the materials.

Disassembly can be performed by inserting between the lips (7, 8) a single wire of appropriate section so as to separate the two lips from each other and thereby disconnect the joint. Locking and separation of the lips are facilitated by the presence of slits on one or the other of the lips (7, 8) or on both lips. The form of the exterior lip (8) is determined to facilitate engagement of the interior flange (5). The fact that the exterior flange (6) presents a slightly smaller radius of curvature assures effective locking of the assembly.

Figure 3:
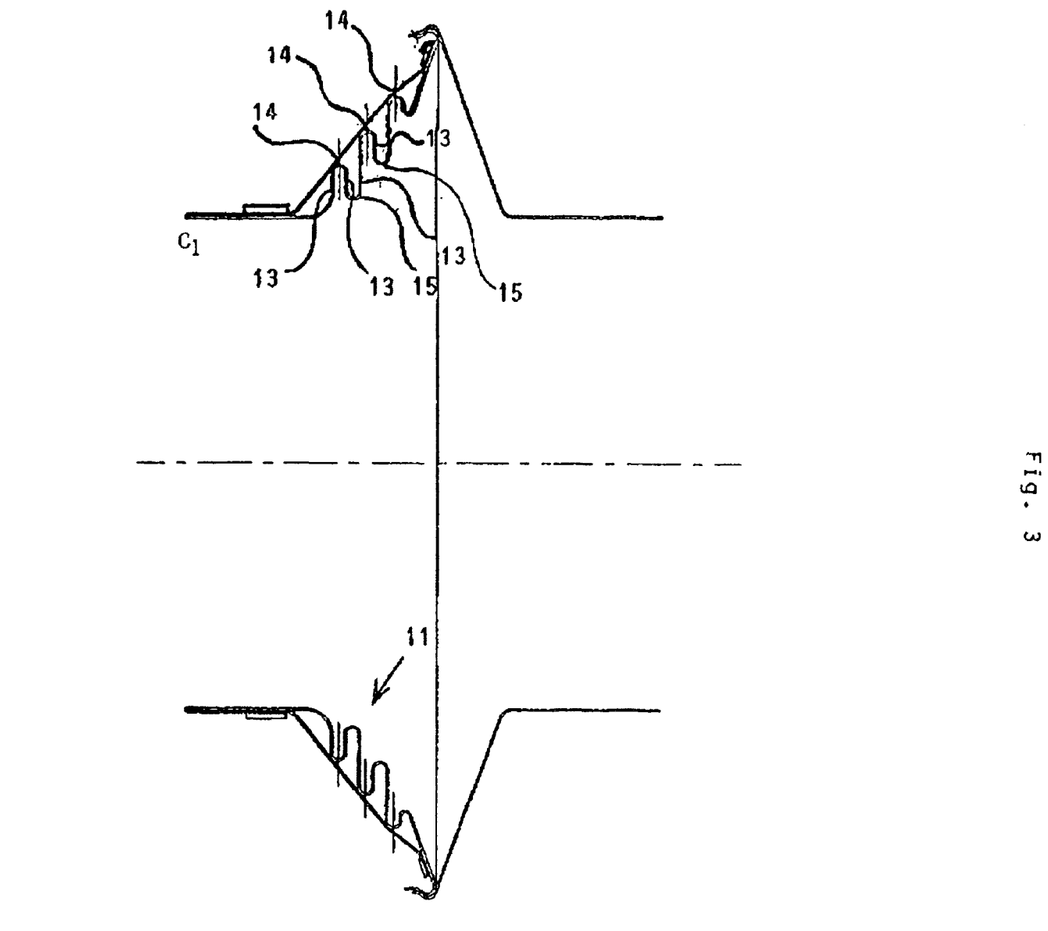
FIG. 3 shows a sectional view of a first variant of implementation.
Figure 4:
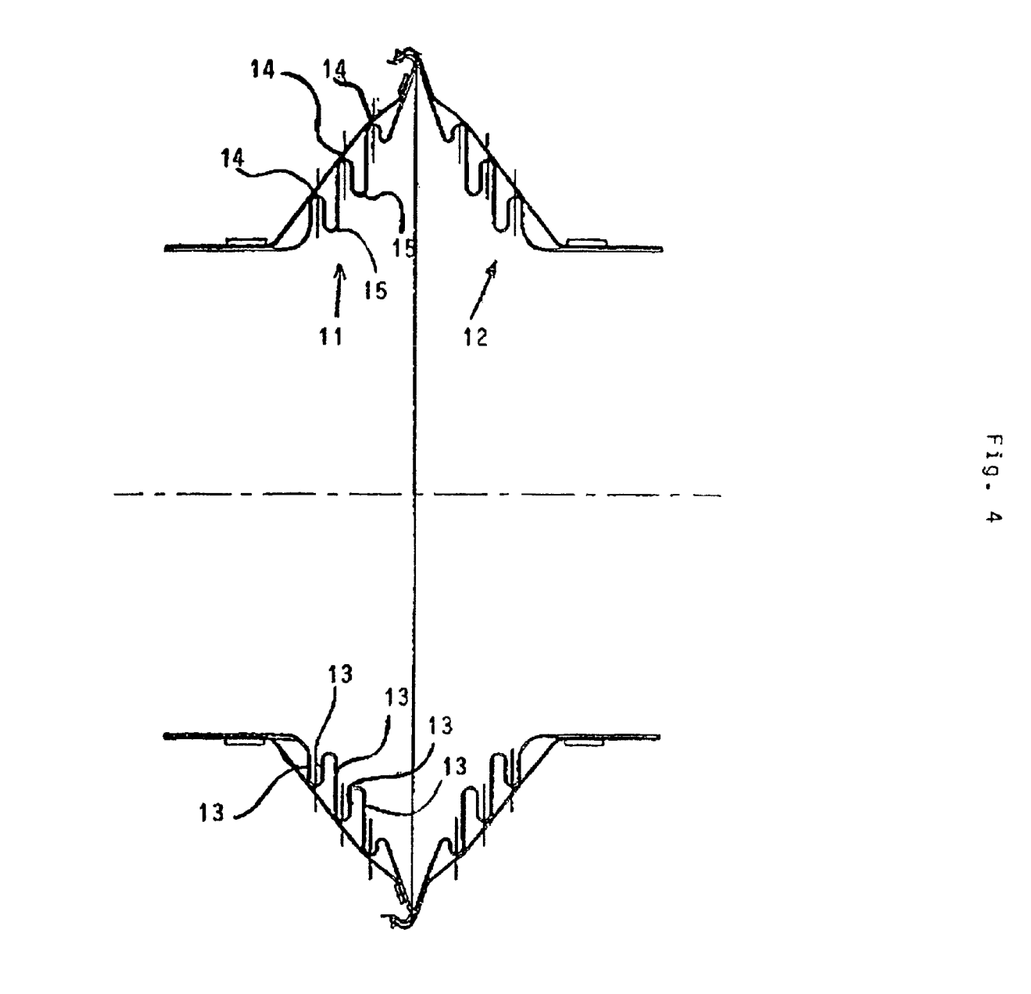
FIG. 4 shows a sectional view of a second variant of implementation.

FIGS. 3 and 4 present two examples of a variant of implementation. According to this variant, the joining device presents a flexibility that allows it to absorb defects in alignment or positioning, and also to absorb displacements relative to the elements. The side of one of the conical flared parts (3) for the version shown in FIG. 3 or the sides of both conical flared parts (3, 4) for the version shown in FIG. 4 has crimps (11, 12).

These crimps are formed by annular segments (13) oriented essentially in transverse planes, connected by toric segments that are alternatively concave (14) or (15) convex. The depth of the crimps is substantially constant in the example described with reference to FIGS. 3 and 4. According to another example of implementation, the depth of the crimps can be variable so as to adapt the flexibility. According to another variant, the flared parts (3, 4) can present a smooth conical zone and a crimped zone.

One particular example of implementation consists of providing on the exterior surface a metal braid which is welded on or maintained by a ring or similar means. This braid protects the crimps against mechanical degradation or absorbs the bottom effects due to internal pressure.

Figure 5:
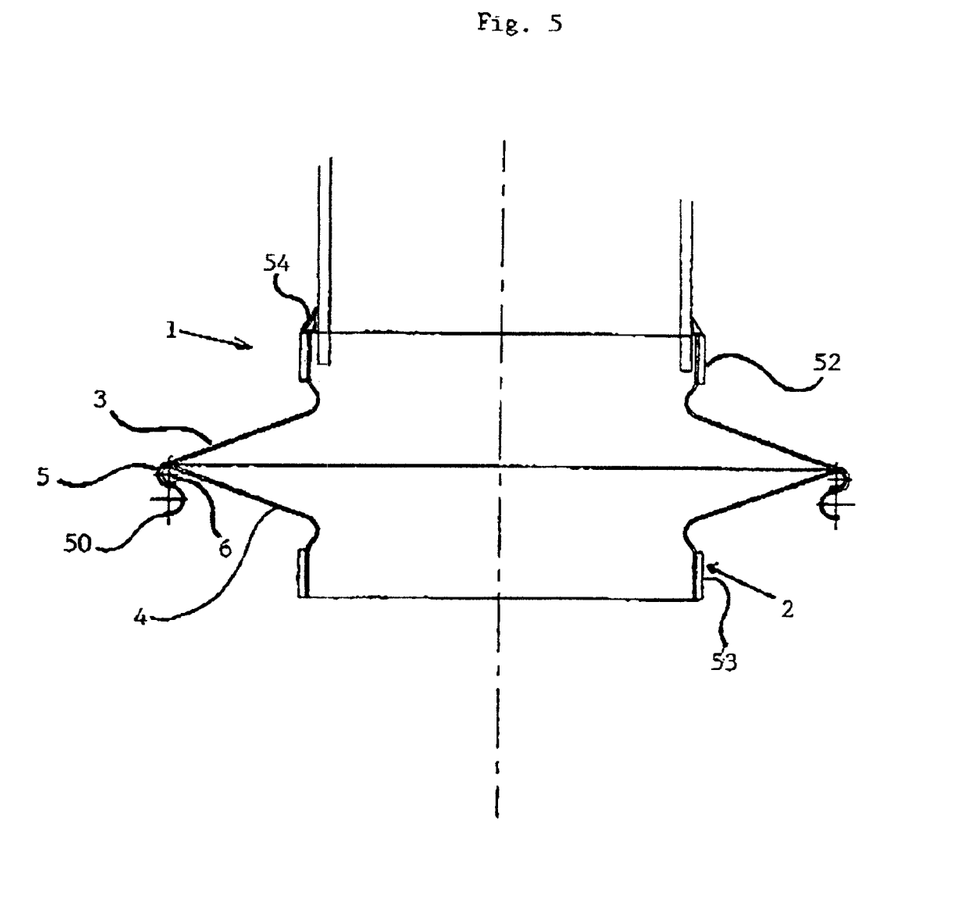
FIGS. 5 and 6 show a detail view and a sectional view, respectively, of a third variant of implementation.
Figure 6:
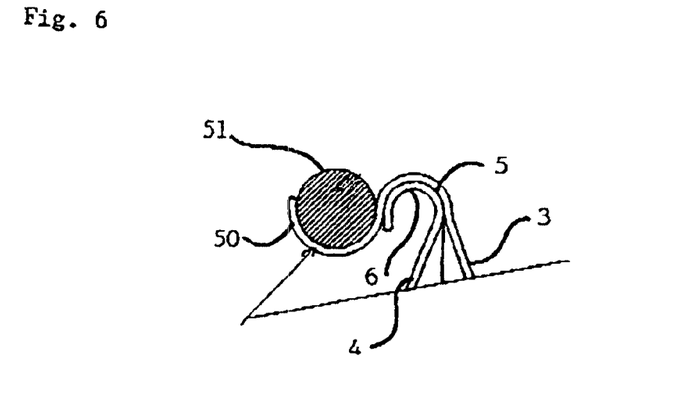

FIGS. 5 and 6 show a detail view and a sectional view, respectively, of a third variant of assembly. As in the preceding variants, the conical skirt (3) of the first tubular element (1) presents a first convex semitoric zone (5) enveloping the convex semitoric flange (6) that extends the conical skirt of the second tubular element (2).

The convex semitoric zone (5) is then extended by a concave semitoric flange (50) forming a peripheral rib in which a rod (51) is housed, thereby assuring locking of the assembly. The convex semitoric zone (5) and/or the concave semitoric flange (50) present radial slits to define the flexible tabs that facilitate passage of the interior semitoric flange (6).

The tubular element (1), and possibly the tubular element (2), present an exterior ring (52, 53) facilitating the attachment of a complementary piece by means of a welding bead (54). The welding bead (54) links the front surface of the ring (54) and the lateral surface of the complementary piece.

Figure 7:
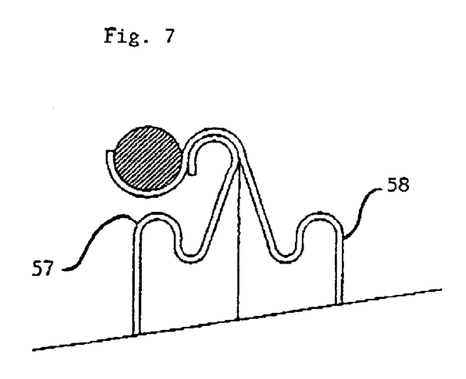
FIGS. 7 and 8 show detail views of other variants of implementation of the semitoric flange assembly.
Figure 8:
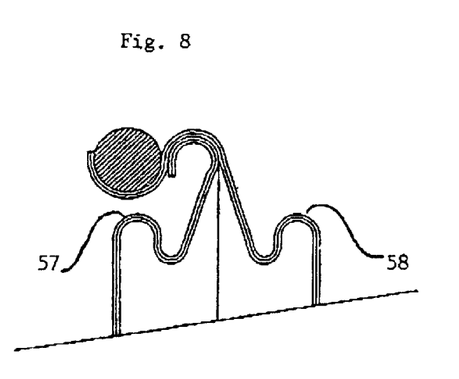
Figure 9:
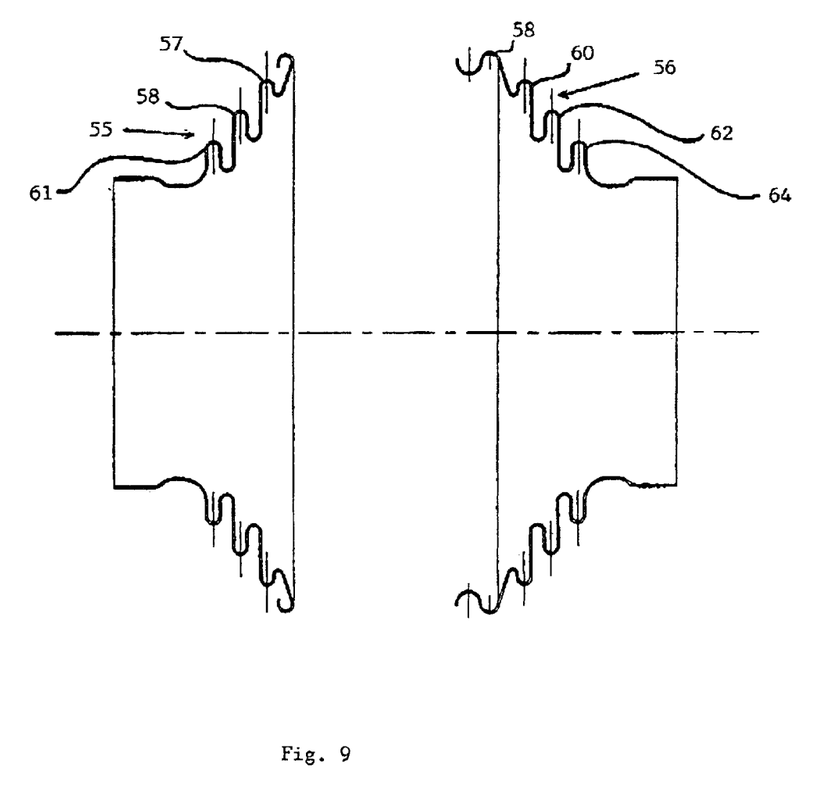
FIG. 9 shows a sectional view of a variant of implementation with a crimped deformable sector.

FIGS. 7 and 8 show detail views of other variants of implementation of assembly with semitoric flanges. FIG. 9 shows a sectional view of such a variant of implementation with a disassembled crimped deformable sector. The tubular element (1, 2) is linked to the joining zone by the intermediary of a skirt with gussets (55, 56) presenting a multiplicity of crimps (57 to 62) oriented axially and spaced apart according to a conical envelope. According to the variant illustrated by FIG. 8, the joining element is made by superposition of metal strips.

Figure 10:
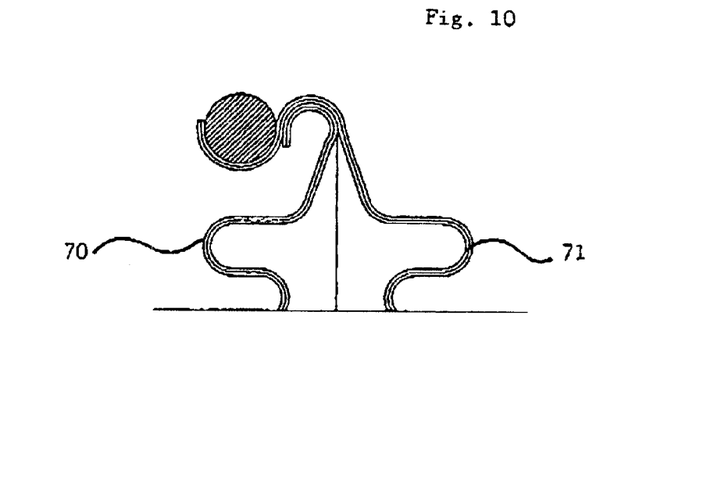
FIGS. 10 and 11 show a detail view and a sectional view, respectively, of a variant of an assembly with a crimped deformable sector.
Figure 11:
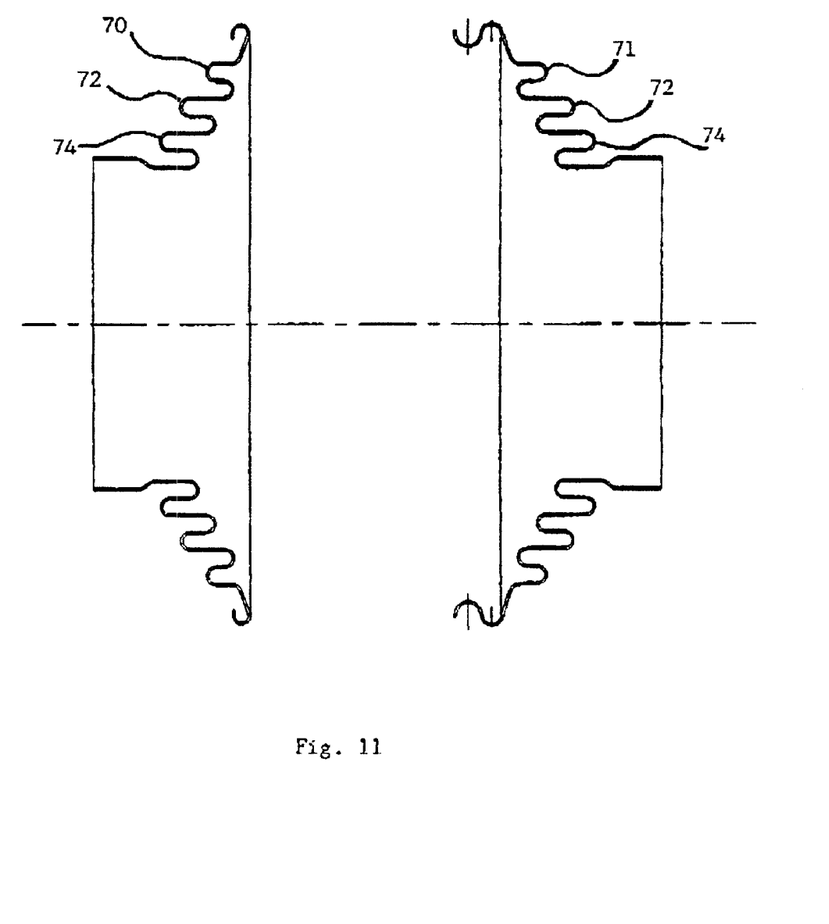

FIGS. 10 and 11 show a detail view and a sectional view, respectively, of a variant of assembly with a crimped deformable sector. According to this example, the crimps (70 to 74) are substantially parallel to the longitudinal axis which facilitates angular displacements.

Figure 12:
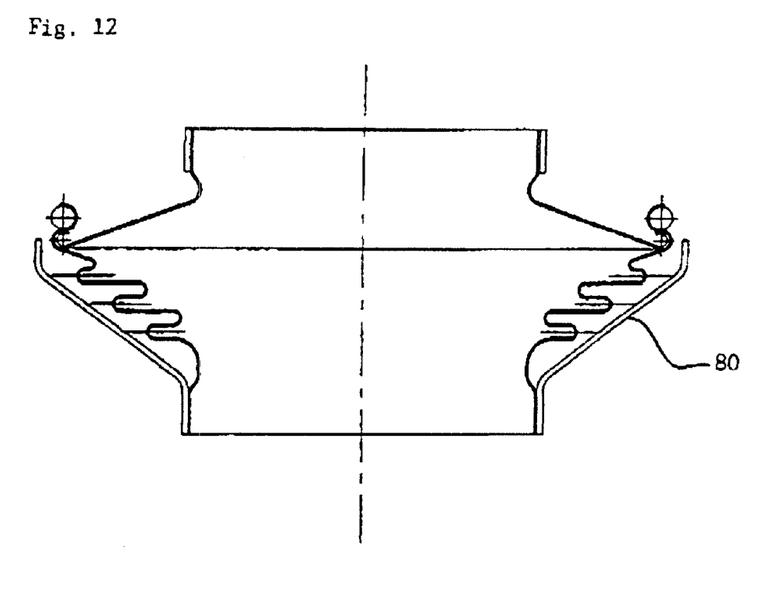
FIGS. 12 and 13 show two variants of implementation with a protective case.
Figure 13:
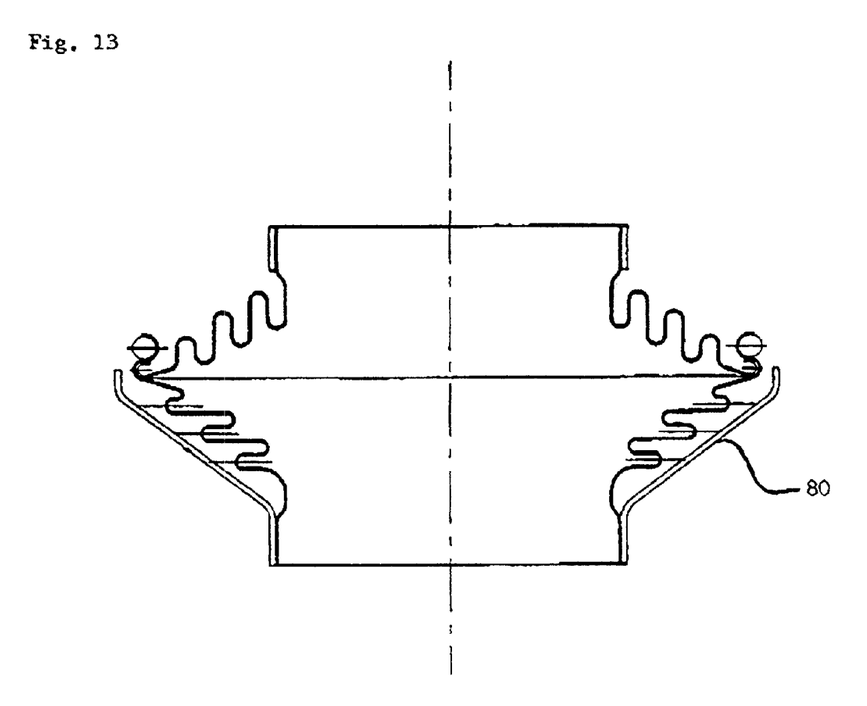

FIGS. 12 and 13 show two variants of implementation with protective cases (80). Case (80) is a conical piece that is brought to cover the crimped zone to protect it and prevent introduction of materials that reduce the flexibility of this zone. This conical piece can be brought to cover either one of the sides of the assembly or both sides.

Figure 14:
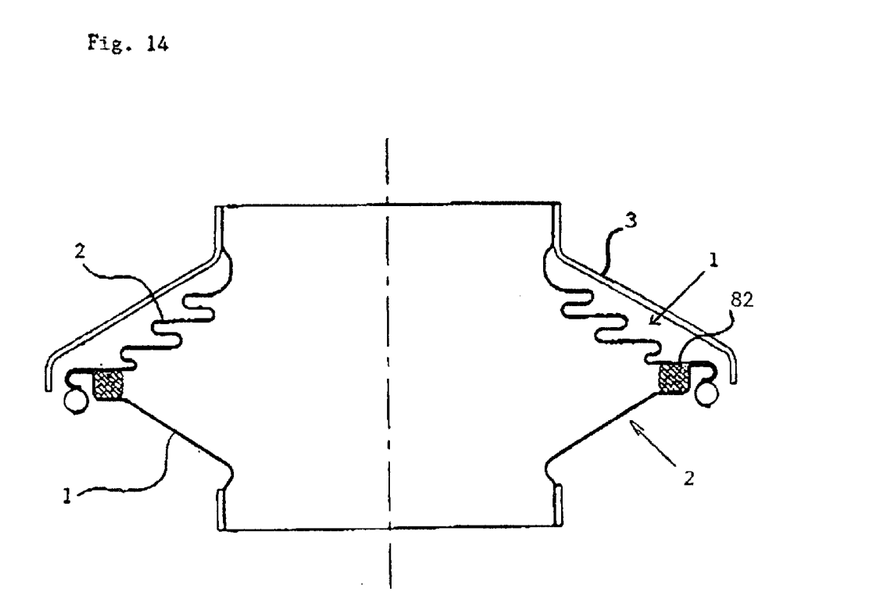
FIGS. 14 and 15 show sectional views of a varient of assmebly that integrates and axisymmetrical bearing.
Figure 15:
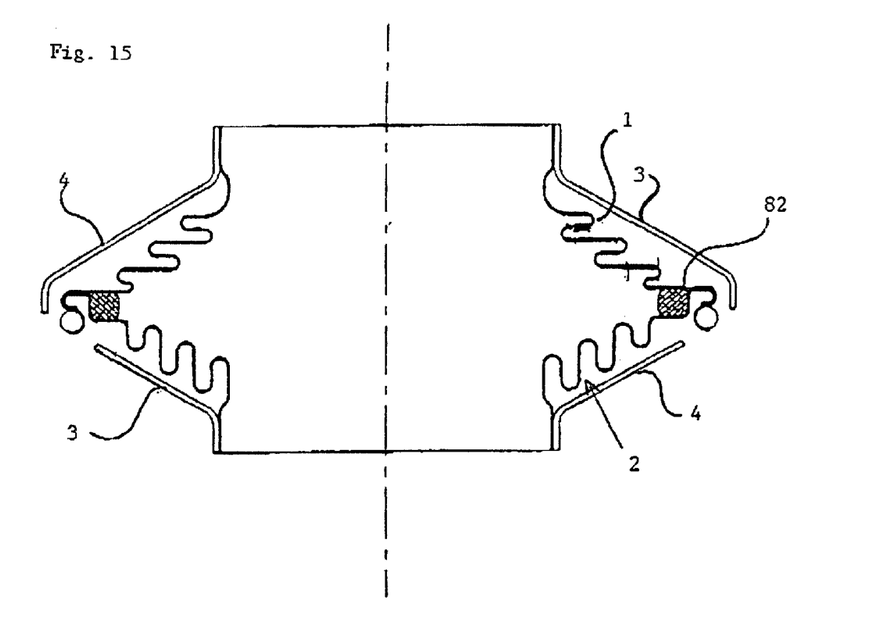

FIGS. 14 and 15 show sectional views of a variant of assembly that integrates an axisymmetric bearing (82) that can absorb vibrations. The bearing (82) is formed by a network of pressed fibers with a density of several grams per $cm^3$. The bearing (82) is wedged between the skirts (1) and (2). FIGS. 14 and 15 show that the skirts can be flat or with crimps parallel to the axis of the system or perpendicular to this axis, and that they can optionally be protected by cases (3) and (4).

Figure 16:
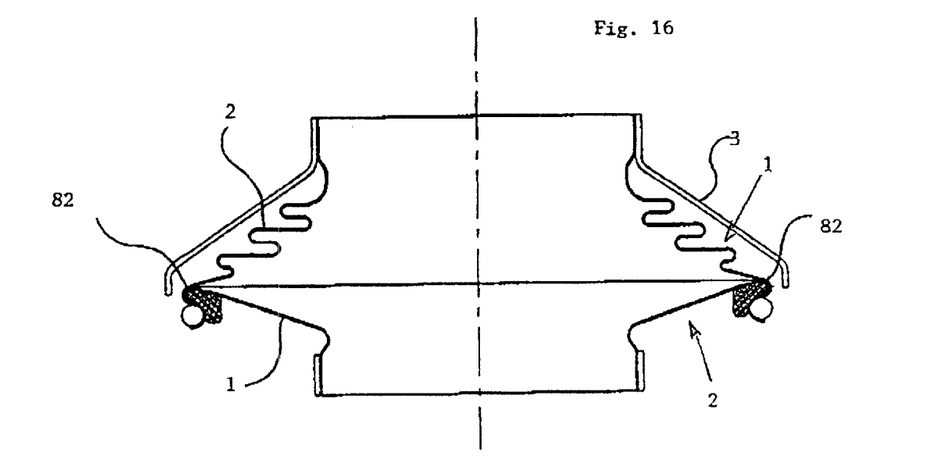
FIGS. 16 and 17 show views comparable to those in FIG. 14 and 15.
Figure 17:
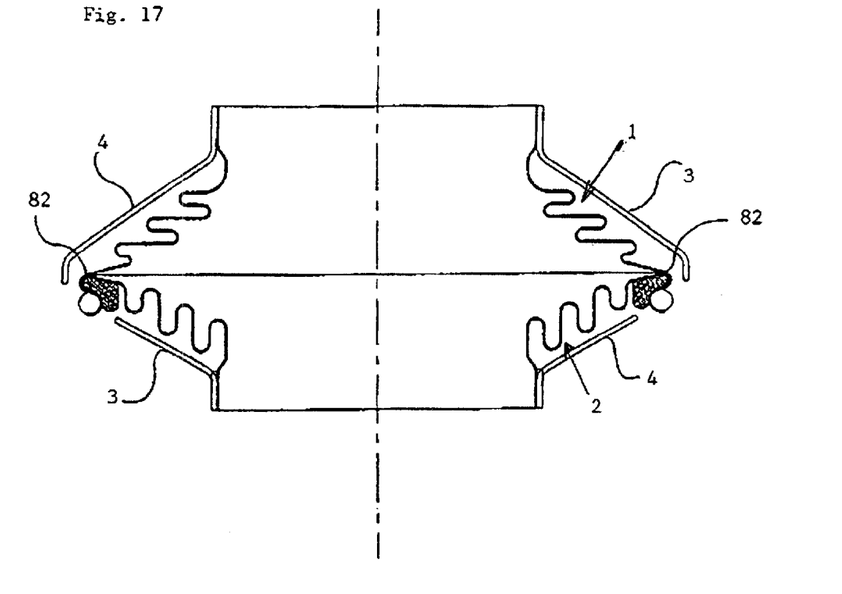

FIGS. 16 and 17 show views comparable to those of FIGS. 14 and 15, except for the bearings which are inserted under the semitoric flanges of the joints.

What is claimed is:

1. A device for joining two tubular elements composed of two complementary extending end portions of said tubular elements, the two complementary end portions each comprising an elastically deformable rigid substantially conical flared part extending toward the other across a joining plane that is substantially perpendicular to said tubular elements and extended by a semitoric flange, with the semitoric flanges being capable of interlocking together.

2. The device according to claim 1, further comprising a locking rod which locks together the semitoric flanges.

3. The device according to claim 1, wherein an exterior one of the semitoric flanges is extended by a circumferential rib in which a locking rod can be placed for locking the assembly.

4. The device according to claim 1, wherein at least one of the semitoric flanges has radial slits for delimiting flexible tabs.

5. The device according to claim 1, wherein at least one of the tubular elements has an exterior ring to facilitate welding on a complementary piece.

6. The device according to claim 1, wherein at least one of the end portions is formed by a multiplicity of superposed strips.

7. The device according to claim 1, wherein at least one of the end portions has a crimped zone between the tubular element and the semitoric flared flange.

8. The device according to claim 7, wherein the crimped zone has a succession of crimps that are axially oriented and axially spaced apart.

9. The device according to claim 7, wherein the crimped zone has a succession of crimps that are transversely oriented and transversely spaced apart.

10. The device according to claim 7, wherein at least one of the conical flared parts is protected by a cone-shaped case.

11. The device according to claim 1, further comprising a damping bearing coupled to at least one of the conical flared parts.

12. The device according to claim 1, wherein the conical flared parts are spread apart in the direction of the joining plane.

13. The device according to claim 1, wherein the semitoric flanges have a closed section over approximately 180°.

14. The device according to claim 13, wherein the semitoric flanges have external extensions extending essentially perpendicularly to a joining plane of the two tubular elements.

15. The device according to claim 12, wherein one of the semitoric flanges has a deformation for housing a semitoric joint.

16. The device according to claim 12, wherein a section of an exterior one of the semitoric flanges has at rest a radius of curvature slightly smaller than a section of an interior one of the semitoric flanges.

17. The device according to claim 12, wherein at least one of the conical flared parts has crimps.

18. The device according to claim 12, wherein the conical flared parts have crimps.

19. The device according to claim 12, fixed on the tubular elements by a connector selected from the group consisting of couplings, collars, welding, gluing, rivets and a crimp connection.

20. The device according to claim 12, further comprising an exterior braid.

21. A tubular element adapted to be joined with a joining means of a complementary element, having on at least one of its ends a tubular element joining means comprising an elastically deformable rigid conical flared part extended by a semitoric flange, wherein said conical flared part is positioned to extend toward a conical flared part extended by semitoric flange in said complementary element joining means across a joining plane that is substantially perpendicular to said tubular element so that said semitoric flanges may interlock.

22. The tubular element according to claim 21, wherein the conical flared part spreads and the semitoric flange has a closed section over approximately 180°.

23. The tubular element according to claim 22, wherein the semitoric flange has an external extension extending essentially perpendicularly to a joining plane.

24. The tubular element according to claim 19, wherein the semitoric flange has a deformation. for housing a semitoric joint.

25. The tubular element according to claim 19, wherein at least one of the conical flared parts has crimps.

26. The tubular element according to claim 19, further comprising an exterior braid.

* * * * *